Nov. 24, 1964  W. E. BAUER ETAL  3,158,001
METER
Filed May 13, 1963
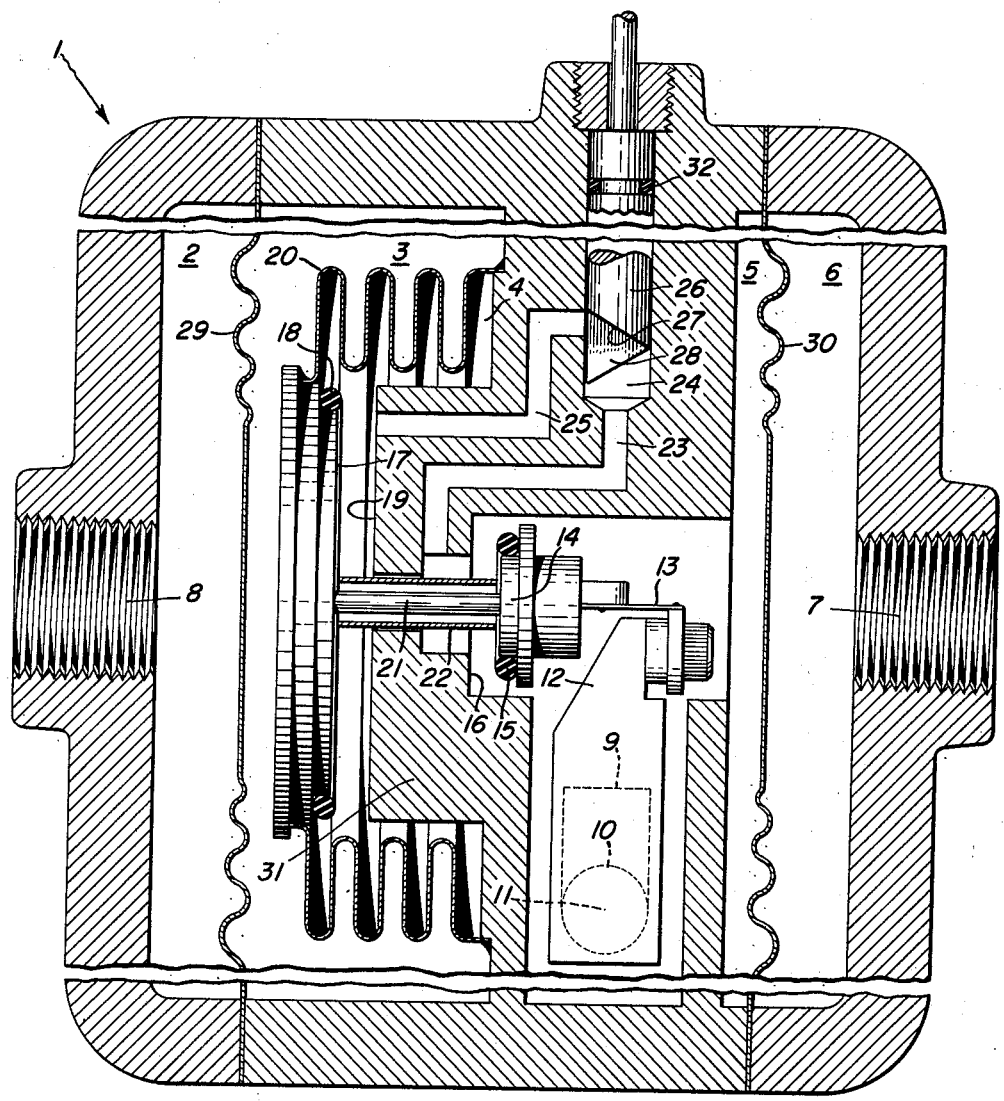
INVENTORS.
WILLIAM F. NEWBOLD
WILLIAM E. BAUER
BY ROBERT B. WATROUS
Arthur H. Swanson
ATTORNEY.

United States Patent Office 3,158,001
Patented Nov. 24, 1964

3,158,001
METER
William E. Bauer, Palmyra, and William F. Newbold, Springfield Township, Montgomery County, N.J., and Robert B. Watrous, Arcadia, Calif., assignors to Honeywell Inc., a corporation of Delaware
Filed May 13, 1963, Ser. No. 280,023
3 Claims. (Cl. 60—54.5)

This invention relates to means for indicating, recording, and/or controlling in response to a pressure, more specifically, in response to the difference between two pressures.

Devices such as this have many uses, particularly for measuring flow. In order that the device be as sensitive as possible; i.e., as responsive to small differences in pressure, it is necessary that the movable element be light in weight and readily movable. A common form of such a movable or sensing element is one or more thin-walled, metallic bellows. Such delicate structures must be protected against overload. In order to provide this protection against overload, it is known to employ one or more of these movable or sensing elements mounted on a rigid case in such a way as to define one or more closed chambers. A substantially incompressible liquid is placed in this closed chamber or chambers. A pair of valves are arranged so that, in the case of an excessive pressure applied to the movable or sensing element, one of the valves closes by seating against a part of the rigid case. This traps liquid in the interior of that movable or sensing element which is exposed to the excessive pressure. Since this liquid is substantially incompressible and since the valve seats against a part of the rigid case, the sensitive movable element is protected against breakage due to overload by means of the liquid trapped within it.

It is an object of this invention to provide a pressure responsive device which will not shift due to changes in ambient temperature or static pressure. These anti-shift or compensating means comprise a pair of seals, such as diaphragms, which are of equal area and spring gradient and which, together with the movable or sensing element and the rigid case, define two chambers on either side of the sensing element, which chambers are of substantially equal volume. Any change in ambient temperature or static pressure will cause equal changes in the pressure on the opposite sides of the movable or sensing element and thus there will be no movement of the sensing element.

A better understanding of the present invention may be had from the accompanying drawing of descriptive matter, in which:

The single figure of the drawing is a longitudinal cross section in diagrammatic or schematic form with parts broken away to reduce the vertical dimension.

The device of this invention is disclosed in more or less diagrammatic form since many of the elements may be made in various different ways. A rigid case 1 has its interior divided into five chambers by means of partition 31, seals 29 and 30, and movable or sensing element 20. These chambers are: respectively; chamber 2, which is exposed to the low pressure to be measured; chamber 3, which is on the left of the movable or sensing element 20; chamber 4, which is in the center of the device on the right of the sensing element 20 and on the left of partition 31; chamber 5, which is on the right of partition 31; and chamber 6, which is exposed to the high pressure which is to be measured.

Inlet port 7 admits high pressure through case 1 to chamber 6. Inlet port 8 admits low pressure to chamber 2 in case 1.

The output element of the device comprises a lever 9 mounted outside of case 1 and connected to the output end of a take-off 10, such as a torque tube. Torque tubes like this are well known and need not be described in detail herein. Torque tube 10 includes a thin-walled tube adapted to be twisted about an axis or pivot, indicated at 11. Within case 1 a torque arm 12 is connected to the inner arm of the torque tube 10. Torque arm 12 is adapted to be rocked about axis 11 by a flexible link or bellows strap 13, which is spot welded or otherwise attached at one end to the upper or movable end of torque arm 12 and which is attached by spot welding or the like at its other end to a valve assembly.

This valve assembly comprises a connecting rod 21 on which is mounted an overload valve 14 having a sealing element in the form of an O-ring 15 adapted to seat against a rigid valve seat 16 forming part of case 1. Connecting rod 21 also carries a second overload valve 17 having a second O-ring 18 and adapted to seat against a second valve seat 19 forming a part of rigid case 1.

Movable or sensing element 20 is shown as a thin-walled bellows fastened at its right end to case 1 and at its left end to the valve assembly so that movement of element 20 causes torque arm 12 to rock about its axis 11 and to actuate the output element 9 of the device. In the embodiment shown, the sensing element 20 has an effective diameter of approximately one and one quarter inches. The effective diameter of the seals 29 and 30 is approximately three and five-eighths inches. The ratio of these diameters is chosen depending upon the range of the differential pressure being measured. Since the travel of the seals 29 and 30 is small and the travel of the sensing element 20 is relatively large, it is a feature of this invention to use seals having a large effective diameter relative to the effective diameter of the sensing element. This provides more movement of the sensing element than of the seals.

Means are provided for damping out small, unwanted, short-time changes in pressure applied to the sensing element 20. These damping means comprise a damping passage 23 leading from chamber 5 to a second damping passage 24 whence a third damping passage 25 leads to chamber 4. In damping passage 24 is located a damping rod 26 which has at its inner end a pair of faces 27 and 28 of such shape that turning the damping rod 26 opens or closes the inner end of damping passage 25 and thereby permits or prevents the flow of liquid through the damping passage formed by the passages 25, 24 and 23. In other words, damping rod 26 is manually adjustable from the outside of case 1 so as to vary the amount of opening between chambers 4 and 5 and thereby vary the rate at which liquid can flow therebetween. Damping chamber 24 and damping rod 26 are sealed against the escape of liquid between them by one or more O-rings 32.

The valve assembly is mounted in case 1 by means of a tubular bearing 22 which surrounds the connecting rod 21 and has a sliding, liquid-tight fit with rigid case 1. The damping passages 25, 24 and 23 form a bypass around the seal formed by the guide tube 22.

Means are provided to prevent the device from shifting upon changes in ambient temperature or static pressure applied to the device. These means are comprised by seals 29 and 30 which are of substantially equal area and substantially equal spring gradient and since the volume of chamber 3 is substantially equal to the volume of chambers 4 and 5, any change in ambient temperature or static pressure will simply cause equal changes in pressures in chambers 3, 4, and 5 and, therefore, will not change the pressure applied to the opposite sides of movable or sensing element 20. Therefore, there is no tendency for the device to move upon changes in ambient temperature or static pressure applied thereto.

Output element 9, which is outside of case 1, may be used to actuate an indicator, a recorder, or a portion of a controller, either directly, or through an amplifying device. Such amplifying devices may comprise mechanical, electrical, or pneumatic amplifiers, which are well known in and of themselves. An example of such a device is found in United States Patent 2,800,725, patented October 8, 1957, to Booth, Du Bois and West.

The operation of this device is as follows. Assume that the pressure applied to the outer face of seal 29 is the same as the pressure applied to the outer face of seal 30. The device is therefore at rest and both overload valves 14 and 17 are out of engagement with cooperating valve seats 16 and 19, respectively.

Now assume the pressure applied to the outer face of seal 30 to increase. This increase in pressure causes the movable portion of seal 30 to move. This increase in pressure in chamber 6 increases the pressure in chamber 5, in passages 23, 24 and 25, and, consequently, increase the pressure in chamber 4. This increase in pressure in chamber 4 causes a sensing element 20 to move to the left. This movement of sensing element 20 causes the upper end of torque arm 12 to rotate counter-clockwise about axis 11 and thereby causes the output element 9 to move counter-clockwise and actuate the indicator, recorder, or controller element attached to it.

If the force of the sensing element 20 is to be measured, the movement of sensing element 20 need only be exceedingly minute, of the order of a few thousandths of an inch, and is complete to the limit of movement before the corresponding overload valve closes. If the pressure applied to the outer face of seal 30 exceeds the pressure applied to the outer face of seal 29 to an excessive extent, sensing element 20 will cause the overload valve 14 to seat against its seat 16 and thereby trap liquid in the chambers 6 and 5.

Since this liquid is substantially incompressible, seal 30 is supported by the liquid trapped behind it and withstands the pressure applied to it.

If the motion of the sensing element 20 is to be measured, this motion may be large relative to the motion of sensing element 20 when its force is being measured. If the pressure applied to the outer face of seal 29 exceeds the pressure applied to the outer face of seal 30, sensing element moves in the opposite direction and causes take-off element 10 to actuate the output element 9 in the opposite direction. If this pressure becomes excessive, overload valve 17 is closed against the seat 19 thereby trapping liquid in chambers 3 and 4 and preventing damage to sensing element 20.

What is claimed is:

1. In a presssure responsive device having a sensing element adapted to move in response to a difference in pressure applied to the opposite faces thereof, the improvement comprising means for preventing said sensing element from shifting due to changes in the ambient temperature or static pressure applied to the device, said improvement including, a rigid case in which said sensing element is mounted and having inlet ports passing through the wall thereof, a pair of seals of substantially equal area and spring gradient each mounted in said case and each located between one of said inlet ports and a liquid-filled conduit formed in the interior of said case and having portions of equal volume located on opposite sides of said sensing element, and a pair of overload valves each controlling the flow of liquid through a portion of said conduit and adapted to trap liquid in said conduit and thereby support said sensing element against pressure applied thereto.

2. A device responsive to pressure which device will not shift when the ambient temperature or the static pressure applied thereto changes, including, a rigid, hollow case having a perforated partition forming part thereof and having a pair of inlet ports passing through the wall thereof, said partition having a damping passage through it, a pair of seals of substantially equal area and spring gradient mounted in said case and each located between one of said inlet ports and said partition and thereby dividing the interior of said case into chambers, a sensing element having a stationary portion mounted on said case and a movable portion located in said case between one of said seals and said partition and separating the space between said seal and said partition into two chambers in said case, said case having a take-off chamber in it on the opposite side of said partition from said measuring element, the chamber on one face of said measuring element being equal in volume to the chamber on the other face of said measuring element plus said take-off chamber, said chambers being adapted to contain a substantially incompressible liquid so that changes in the pressure applied to said liquid due to changes in ambient temperature or static pressure applied to said device are equal on the opposite faces of said sensing element, a pair of overload valves movably mounted in the perforation in said partition and adapted to permit or to prevent the flow of liquid through said damping passage, a take-off located in said take-off chamber in said case and passing through the wall of said case, and means connecting said sensing element to said overload valves and to said take-off so as to operate said overload valves and said take-off.

3. In a pressure responsive device having a sensing element adapted to move in response to a difference in pressure applied to the opposite faces thereof, the improvement comprising means for preventing said sensing element from shifting due to changes in the ambient temperature or static pressure applied to said device, said improvement including, a rigid case in which said sensing element is mounted and having inlet ports passing through the wall thereof and a perforated partition forming part thereof, a pair of seals of substantially equal area and spring gradient and each mounted in said case and each mounted between one of said inlet ports and said partition, said seals and said partition forming a liquid-filled conduit in the interior of said case and having portions of equal volume located on opposite sides of said sensing element, a take-off located in said conduit and passing through the wall of said case, and means connecting said sensing element to said take-off so as to operate said take-off.

References Cited in the file of this patent
UNITED STATES PATENTS

| | | |
|---|---|---|
| 2,747,614 | Gray | May 29, 1956 |
| 2,977,991 | Bauer | Apr. 4, 1961 |
| 3,047,022 | Aldinger | July 31, 1962 |
| 3,058,350 | Brown | Oct. 16, 1962 |
| 3,085,437 | Osterstrom | Apr. 16, 1963 |